United States Patent [19]

Ferri

[11] Patent Number: 5,491,830

[45] Date of Patent: Feb. 13, 1996

[54] AUTOMATIC SLOT IDENTIFICATION AND ADDRESS DECODER ARRANGEMENT

[75] Inventor: Vincent Ferri, Pittsburgh, Pa.

[73] Assignee: Westinghouse Air Brake Company, Wilmerding, Pa.

[21] Appl. No.: 384,471

[22] Filed: Jan. 31, 1995

Related U.S. Application Data

[63] Continuation of Ser. No. 880,867, May 11, 1992, abandoned.

[51] Int. Cl.[6] .................................................. G06F 13/20
[52] U.S. Cl. ........................ 395/829; 395/282; 395/830; 364/DIG. 1
[58] Field of Search ..................... 395/829, 830, 395/284, 828, 282

[56] References Cited

U.S. PATENT DOCUMENTS

| | | | |
|---|---|---|---|
| 4,360,870 | 11/1982 | McVey | 395/829 |
| 4,556,953 | 12/1985 | Caprio et al. | 395/282 |
| 4,675,813 | 6/1987 | Locke | 395/829 |
| 4,701,878 | 10/1987 | Gunkel | 395/282 |
| 4,755,934 | 7/1988 | Inoue | 395/823 |
| 4,760,553 | 7/1988 | Buckley et al. | 395/183.21 |
| 4,773,005 | 9/1988 | Sullivan | 395/829 |
| 4,899,274 | 2/1990 | Hansen et al. | 395/200.1 |
| 4,964,038 | 10/1990 | Louis et al. | 395/829 |
| 5,038,299 | 8/1991 | Maeda | 395/836 |
| 5,038,320 | 8/1991 | Heath et al. | 395/830 |
| 5,073,773 | 12/1991 | Van Steenbrugge et al. | 340/825.03 |
| 5,155,378 | 10/1992 | Takagi et al. | 361/736 |
| 5,175,822 | 12/1992 | Dixon et al. | 395/829 |
| 5,204,669 | 4/1993 | Dorfe et al. | 340/825.52 |
| 5,226,123 | 7/1993 | Vockenhuber | 395/311 |
| 5,274,771 | 12/1993 | Hamilton et al. | 395/829 |

Primary Examiner—Parshotam S. Lall
Assistant Examiner—Viet Vu
Attorney, Agent, or Firm—James Ray & Associates

[57] ABSTRACT

An automatic slot identification and address decoding arrangement having a motherboard for conveying address information, data and control signals to printed circuit cards. An electrical cable connector for establishing a particular address for each of the printed circuit cards. Each of the printed circuit cards includes a programmable logic device for dynamically recognizing the address information received from the motherboard, and each of the printed circuit boards includes electronic circuitry for conveying the data and control signals to the electrical cable connector.

20 Claims, 3 Drawing Sheets

AUTOMATIC SLOT IDENTIFICATION AND ADDRESS DECODER ARRANGEMENT

This is a continuation of application Ser. No. 07/880,867, filed May 11, 1992, now abandoned.

FIELD OF THE INVENTION

This invention relates to an automatic slot identification and address decoding arrangement for electronic printed circuit boards of a bus oriented multiple-slot microprocessor based system, and more particularly, to a dynamic address recognition and decoding system including a motherboard for conveying address information, data and control signals to a printed circuit board which has a programmable array logic device for dynamically recognizing the address information and which has electronic circuits for processing the data and control signals to a cable connector which is connected to external control equipment of a locomotive brake control system.

BACKGROUND OF THE INVENTION

In present-day microprocessor based systems, it is common practice to utilize custom-built printed circuit cards or boards to control and/or monitor external events and conditions. These customized cards, along with the microprocessor card, are arranged to be plugged into select positions or discrete slots on a motherboard of a bus oriented system. Each of the cards carries the necessary electronics for interfacing with the bus line and for controlling and monitoring the operations of external devices. The motherboard is designed to enable the microprocessor to pass the address, data and control signals to associated peripheral printed circuit cards. The input signals are appropriately distributed at select locations and along the motherboard by employing a bus line cable. In the past, all of the input signals on any given bus line were capable of being conveyed by a plug-in connector of a number of slot insert cards unless special precautions were taken to prevent erroneous insertion of a bus plug with a printed circuit card receptacle. In practice, each printed circuit card has the ability to decode and process the information carried by the bus line. The information ingested is dependent upon the particular functional configuration of the card and is controlled by the bus interface electronics carried by each card.

Since the bus is a comprehensive element in the system, any number of cards having the appropriate interface electronic can be interconnected to the bus. Each card is coded or assigned a distinct address and is capable of decoding its address when powered by a bus line. The address identifies each particular card according to the function that it is to perform in operation. Presently, the methods of address decoding do not provide any means for dynamically selecting or altering the particular address assigned to a card. In most cases, the address code is either permanently fixed in the bus interface electronics or is electrically established by jumper wires connected to the card. Thus, if it is desired to modify the address, it is necessary either to replace the electronics hardware or to remove the card from the system so that the jumpers can be changed to set up different address codes. It will be appreciated that these previous methods of modifying the address codes are both time consuming and relatively costly.

OBJECTS AND SUMMARY OF THE INVENTION

Accordingly, it is an object of this invention to provide a new and unique automatic slot identification and address decoding arrangement.

Another object of this invention is to provide a novel dynamic address recognition and decoding system.

A further object of this invention is to provide an automatic slot identification and address decoder for electronic printed circuit boards used in a bus oriented multi-slot microprocessor based system.

Still another object of this invention is to provide a method of address decoding a printed circuit card by having a motherboard supply the address data and control signals to a bus connected thereto.

Still a further object of this invention is to provide an automatic slot identification and address decoding arrangement comprising, a motherboard for conveying address information, data and control signals to printed circuit cards, an electrical cable connector for establishing a particular address for each of said printed circuit cards, each of said printed circuit cards including a programmable logic means for dynamically recognizing the address information received from said motherboard, and each of said printed circuit boards including electronic means for conveying the data and control signals to said electrical cable connector.

Yet another object of this invention is to provide a dynamic address recognition and decoding arrangement comprising, a backplane for conveying address, data and control signals to a number of printed circuit boards, a plug connector having a plurality of electrical contacts in which selected contacts may be electrically modified to represent a given one of a number of binary address codes, a receptacle connector mating with said plug connector and having a plurality contacts which correspond to said plurality of electrical contacts of said plug connector, a programmable logic device mounted on each of said printed circuit boards and responsive to said given one of said binary address codes to condition monitoring and control electronic devices carried by the printed circuit board for processing said data and control signals and for conveying the processed information to an output connector for subsequent usage.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
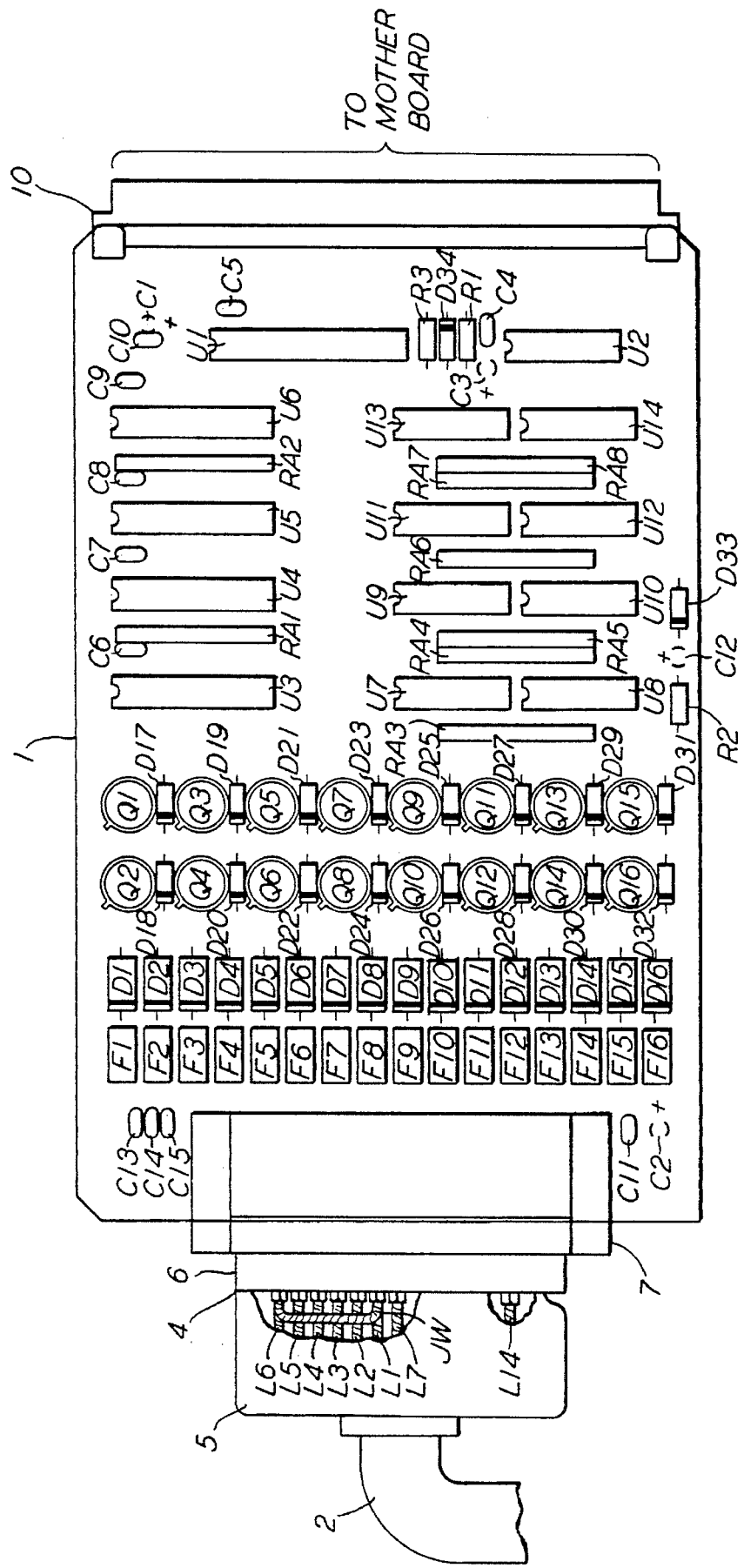
FIG. 1 is a side plan view of a printed circuit board or card having the electronic processing elements and including an input cable line connector, partially broken away, along with an in-line contact plug connector adapted to be coupled to a motherboard for controlling and monitoring of the external events of peripheral equipment.

Referring now to the drawings, and in particular to FIG. 1, there is shown a printed circuit card or board 1 which may be formed of suitable insulating material having a printed wiring pattern including interconnecting conductive strips (not shown) and having terminal contact portions for being solder-connected to the leads of the electrical and electronic components mounted thereon. The circuit components take the form of resistors R1–R3 and RA1–RA8, capacitors C1–C12, diodes D1–D34, transistors Q1–Q16, fuses/F10/F16, logic or integrated circuit devices U1–U14, conductors L1–L7, L14 and JW, connectors or plugs 4, 5, 6 and 10, and the like.

It will be noted that the slot identification (id) information along with the control and monitor signals are carried by cable 2 which includes a multitude or plurality of electrical wires or conductors, such as, the six (6) conductive leads L1, L2, L3, L4, L5, and L6 which are used for the coded address and the remaining conductive leads, some of which are represented by leads L7–L14 carry the data and control signal information. It will be seen that the insulated cable and electrical conductors L1–L14 are connected to select ones of fifty (50) contact pin plug connector 4 which includes a plastic clam shell housing 5, a metallic shell 6 and thermoplastic insert which accommodates the plurality of contact pins. The pins of the plug connector 4 mate with the respective contact sockets carried by the board-mounted receptacle 7. The board-mounted receptacle 7 is solder-connected to the associated conductive strips which lead to the electrical leads of the discrete electrical and electronic components or elements that are mounted on the printed circuit (PC) board or card 1.

Figure 2:
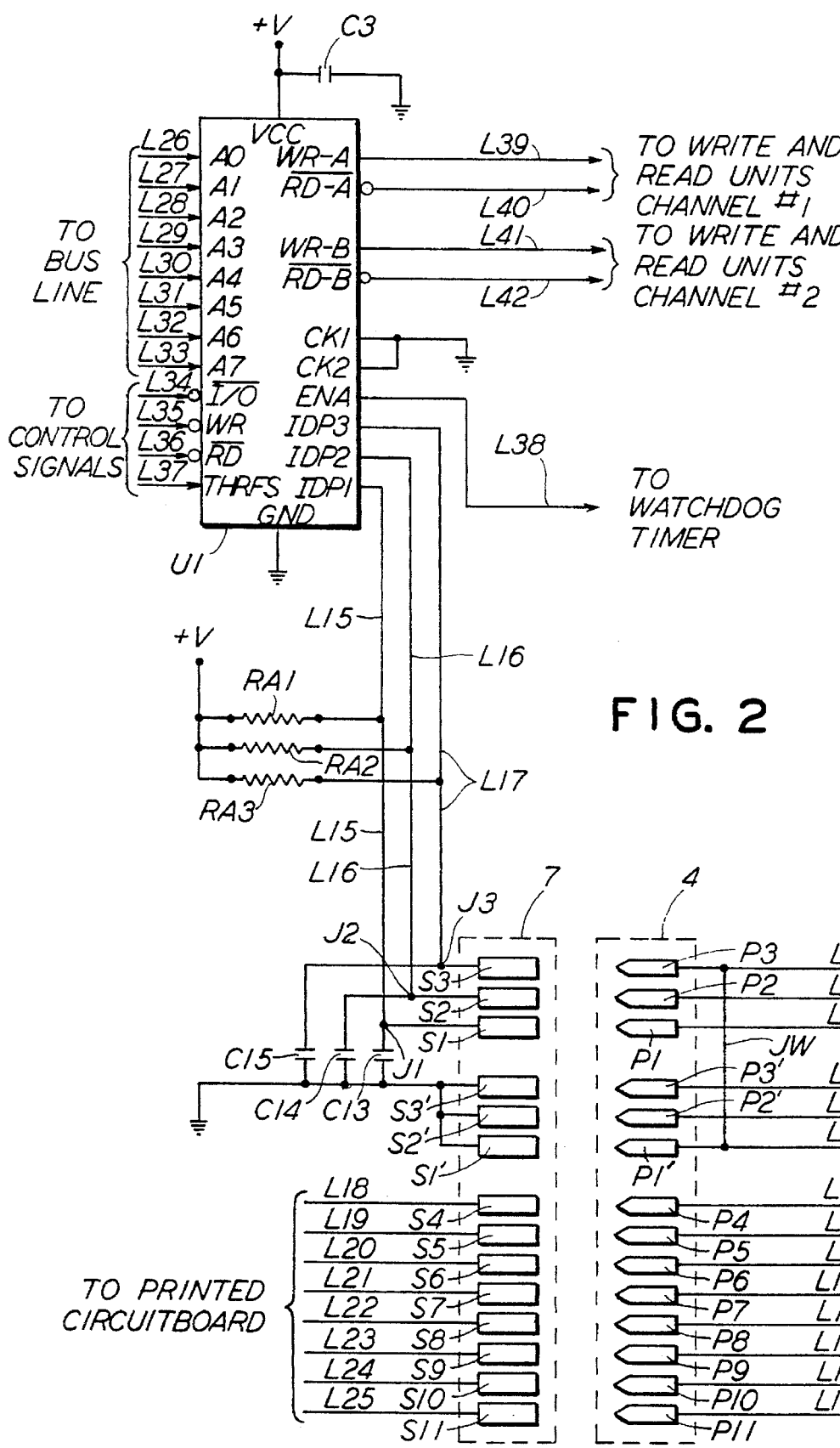
FIG. 2 is a schematic circuit diagram of a portion of the electrical and electronic elements and components which are carried by the printed circuit card of FIG. 1.

Referring now to FIG. 2, it will be seen that lead-in wires or conductors L1, L2, L3, L4, L5, and L6 of the multiconductor cable 2 are connected to six (6) slot identification contact pins P1, P2, P3, P1', P2', and P3', respectively, and the data and control wires or conductors L7–L14 of cable 2 are connected to contact pins P4–P11, respectively. As shown, the contact pins P1, P2, P3, P1', P2', and P3' are adapted to enter and electrically engage female contact sockets S1, S2, S3, S1', S2', and S3', respectively, and the contact pins P4–P11 engage female sockets S4–S11, respectively, when the plug connector 4 is inserted into the receptacle connector 7. It will be appreciated that the sockets S4–S11 are connected to the conductive strips or leads L18–L25 of the printed circuit board 1. It will be noted that the contact sockets S1', S2', and S3' are connected in common and are jointly connected to ground while the contact sockets S1, S2, and S3 are connected to junction points J1, J2, and J3, respectively. A first filter capacitor C13 is connected between junction point J1 and ground, a second filter capacitor C14 is connected between junction point J2 and ground, and a third filter capacitor C15 is connected between junction point J3 and ground. It will be noted that one end of a current limiting resistor RA1 is connected to junction point J1 while the other end of current limiting resistor RA1 is connected to a positive voltage supply terminal +V. Similarly, one end of a current limiting resistor RA2 is connected to junction point J2 while the other end of the current limiting resistor RA2 is connected to the voltage supply terminal +V. In a like manner, one end of a current limiting resistor RA3 is connected to junction point J3 while the other end of current limiting resistor RA3 is connected to the voltage supply terminal +V. Further, it will be seen that junction points J1, J2 and J3 are connected to the respective input terminals IDP1, IDP2, and IDP3 of an erasable programmable array logic (PAL) device U1 via leads L15, L16, and L17, respectively. The logic device U1 is a type EP600 employing CHMOS EPROM technology and/or is manufactured and marketed by Altera Corporation of Santa Clara, Calif.

It will be seen that one or more jumper wires may be connected between the contact pins P1, P2 and P3 and the contact pins P1', P2', and P3'. As shown in FIGS. 1 and 2, a shunt or jumper wire JW is connected between contact pin P1' and contact pin P3 so that contact socket S3 is effectively connected to ground through contact socket S1' when the plug 4 is inserted into the receptacle 7. Under this condition, the junction point J3 is at a zero voltage level or a low state (L) while the junction points J1 and J3 are at a +V voltage level or a high state (H).

The following table is a listing of four (4) address information codes which may be supplied to write and read channels CH1 and CH2:

| JUNCTION POINTS | | | BOARD ADDRESS | |
|---|---|---|---|---|
| J1 | J2 | J3 | CH1 | CH2 |
| L | L | L | 50H | 51H |
| H | L | L | 52H | 53H |
| L | H | L | 54H | 55H |
| H | H | L | 56H | 57H |

The letter H has no logical significance, but simply denotes a hexadecimal number. In the present instance, the slot address information code is 56H for a write/read channel CH1 and 57H for a write/read channel CH2.

Figure 3:
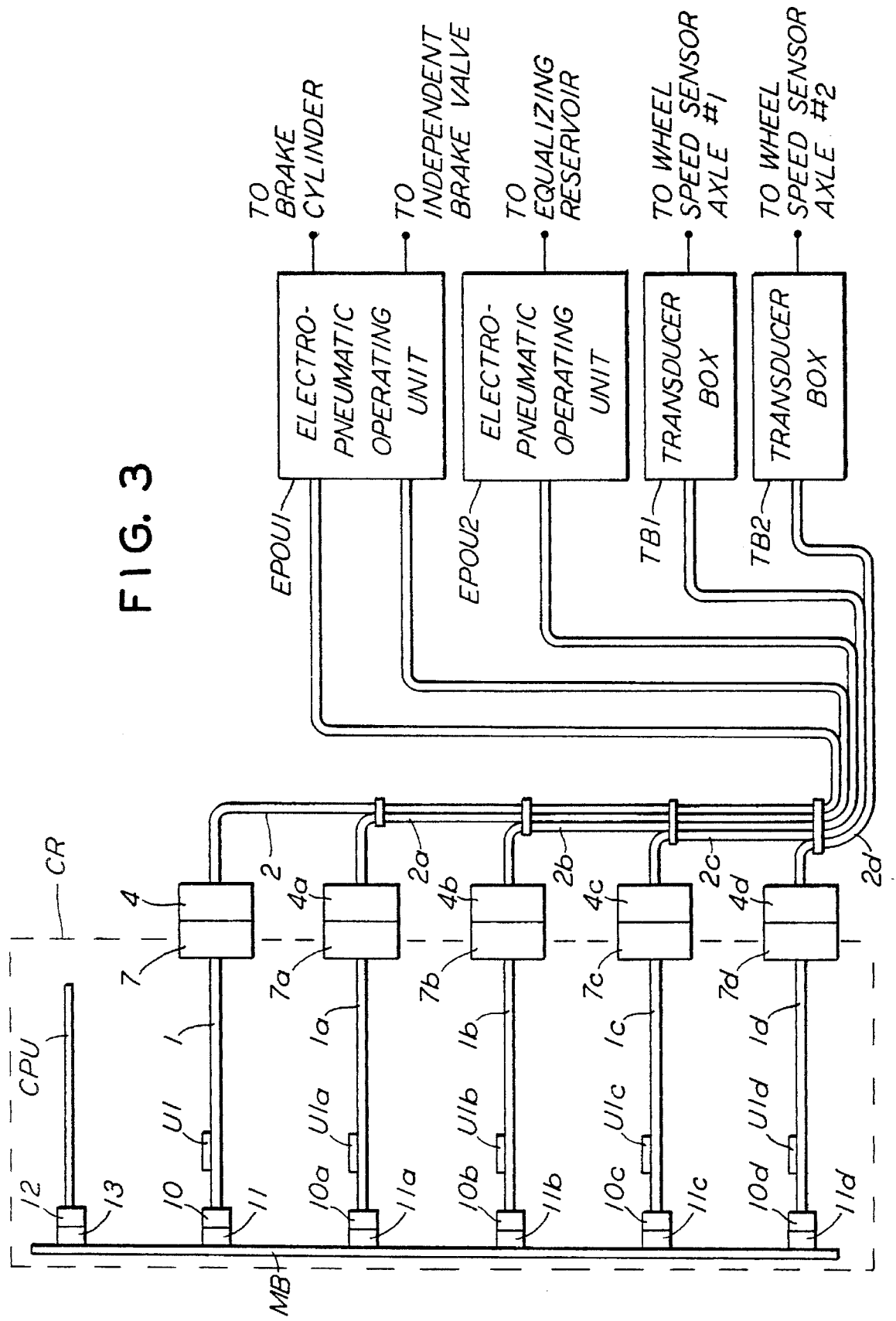
FIG. 3 is a schematic circuit diagram of a slot identification system in accordance with the present invention.

As shown in FIGS. 1 and 3, it will be noted that a card end DIN plug or male connector 10 is mounted to the other end of the printed circuit board or card 1. The electrical plug 10 is inserted into a mating female connector or socket 11 carried by a backplane unit or motherboard MB. The mating connector 11 of the motherboard MB is supplied with the address, data and control signals from the bus line which consists of eight (8) address leads L26–L33 which are connected to terminals A0–A7 and three (3) control leads L34–L36 which are connected to terminals I/O, WR and RD as shown in FIG. 2. Further, it will be noted a positive supply voltage +V is connected to terminal VCC while terminal GND is connected to ground. A lead L37 is connected to a toggle fail-safe input terminal THRF while lead L38 is connected to a terminal ENA which supplies a reset signal to a watchdog timer circuit, and a pair of check terminals CK1 and CK2 are connected in common and are connected to ground. A write output terminal WR-A is connected to a suitable write integral circuit microprocessing unit (not shown) for channel #1 via lead L39 while an inverted read output terminal RD-A is connected to a suitable read integrated circuit microprocessing unit (not shown) for channel #1 via lead L40. Similarly, a write output terminal WR-B is connected to a suitable write integrated circuit microprocessing unit (not shown) for channel #2 via lead L41 while an inverted output terminal RD-B is connected to a suitable integrated circuit microprocessing unit (not shown) for channel #2 via lead L42. As shown in FIG. 3, the binary signals are received from the central processing unit board CPU which is connected to the motherboard MB via the respective male and female connectors 12 and 13. Thus, the central processing unit effectively talks to each of the printed circuit boards 1–1d, and the programmable array logic units U1–U1d provide the logic necessary to decode the address information from the bus based upon the slot identification information received. In addition, a three-bit control signal is received from the central processing unit CPU and is conveyed by the motherboard MB to inverted terminals I/O, WR and RD of the programmable array logic units U1–U1d of the printed circuit boards 1–1d.

As shown in FIG. 3, the printed circuit boards CPU and 1–1d are positioned within a cardmount rack or module CR which includes an assembled backplane or motherboard MB having female or receptacle connectors 13 and 11–11d. The respective printed circuit boards are positioned and slid into upper and lower card guides until the DIN male connectors 12 and 10–10d are fully inserted into matching DIN female connectors 13 and 11–11d, respectively. Next, the pin plug connectors 4–4d are plugged into the respective socket receptacle connectors 7–7d which are respectively electrically connected to the printed circuit boards 1–1d. It will be appreciated the conductive wires or leads of cables 2–2d are electrically soldered or the like to the appropriate pins of the plug connectors 4–4d. As shown, the electrical cable 2 is connected to the electropneumatic operating unit or pneumocard assembly EPOU1 which includes the necessary electrical and pneumatic control elements such as electrical connectors, electropneumatic or solenoid valves, transducers, sensors, pneumatic fittings, connection tubing and/or piping, check valves, chokes, relay valves, strainer, pressure switches, spool valves, etc. It will be seen that the cable 2a is also connected to the electropneumatic operating unit or pneumocard assembly EPOU1. The electropneumatic operating unit EPOU1 is pneumatically connected to the brake cylinder and the independent brake valve. It will be noted that the electrical cable 2b is connected to an electropneumatic operating unit or pneumocard assembly EPOU2 which, in turn, is pneumatically connected to the equalizing reservoir on the railway locomotive.

As shown in FIG. 3, the electrical cable 2c is connected to transducer box TB1 while the electrical cable 2d is connected to transducer box TB2. A brake pipe and brake cylinder transducers as well as necessary electrical receptacle and pneumatic fittings are carried by a weatherproof housing. It will be seen that the transducer box TB1 is coupled to a wheel speed sensor for axle #1 while the transducer box TB2 is coupled to a wheel speed sensor for axle #2.

Thus, it will be apparent that the present method of address decoding has a number of advantages over various systems that are currently being used. With the instant system, it is possible to randomly place several cards into the system without the need of modifying the address decoder hardware since each knows what address it is to decode from the bus. All of the required logic and decision-making for decoding a unique address is performed by the programmable array logic device after it scans the slot identification information provided by the cable plug. Since the address selection and decoding process is performed dynamically, the contention problems are virtually eliminated. Accordingly, the present invention employs an arrangement which involves the use of the bus interface electronics to dynamically decipher the address code that it receives from the bus. The system effectively learns the address which is to be decoded based upon the slot position in which the card is placed. Since the bus is a generic element of the system, any compatible PC card or board having the appropriate interface electronics can be plugged into the motherboard receptacles. Since each card or board has a particularly assigned address, it is possessed of the ability to decode its address from the bus. Thus, each address is used to effectively identify the particular PC board or card according to the function that it is to perform in the overall operation for a railway locomotive initiated brake control system for freight and passenger trains.

Thus, the present invention has been described in such full, clear, concise, and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that various alterations and changes may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate outputs. Therefore, it will be appreciated that certain modifications, ramifications, and equivalents will be readily apparent to persons skilled in the art, and accordingly, it is understood that the present invention should not be limited to the exact embodiment shown and described, but should be accorded the full scope and protection of the appended claims.

I claim:

1. An automatic computer slot identification and address decoder arrangement for a computer having a central processor unit, and a motherboard communicating with such central processor unit, such motherboard having a bus of such computer thereon, such bus having a first group of electrical conductors for conveying each of address information, control signals and data, such control signals including signals for reading and signals for writing, such bus having a plurality of in-line connectors, each of such in-line connectors being adapted to receive a printed circuit card, and make multiple electrical connections to a second group of electrical conductors on such printed circuit card, such printed circuit card being connected to an external electrical cable which is connected to external equipment, said automatic computer slot recognition and address decoder arrangement comprising:

(a) a third group of electrical conductors disposed on such printed circuit card;

(b) a first multiple contact connector means disposed on such printed circuit card for connecting to such external electrical cable, a plurality of contacts of said first multiple contact connector means being connected to corresponding members of said third group of electrical conductors;

(c) a second multiple contact connector means disposed on such external electrical cable having a fourth group of electrical conductors, a plurality of contacts of said second multiple contact connector means being connected to corresponding members of said fourth group of electrical conductors disposed on such electrical cable, said first multiple contact connector means mating with said second multiple contact connector means to provide individual electrical connections between corresponding members of said third group of electrical conductors and said fourth group of electrical conductors;

(d) means for connecting shunt conductors between a plurality of members of said fourth group of electrical conductors for establishing an electrical configuration indicative of address information for such computer card to which such cable is attached;

(e) means disposed on each of such printed circuit cards for applying electrical voltages to a plurality of members of said third group of electrical conductors whereby voltages are applied through contacts of said first multiple contact connector means and contacts of said second multiple contact connector means to a plurality of members of said fourth group of electrical conductors to sense said electrical configuration indicative of address information;

(f) means disposed on each of such printed circuit cards for determining an address for reading and an address for writing, based on said electrical configuration;

(g) means disposed on each of such printed circuit cards for decoding address information from such motherboard, and responding to address signals indicative of said address for reading and said address for writing; and (h) means responsive to control signals received from such computer bus for placing a plurality of members of such first group of conductors on such computer bus in communication with a corresponding plurality of said fourth group of conductors on such electrical cable to external equipment.

2. The automatic slot identification and address decoder arrangement as defined in claim 1 wherein said shunt conductors are binary coded to represent the particular address.

3. The automatic slot identification and address decoder arrangement as defined in claim 1, wherein each of said shunt conductors is a jumper wire.

4. The automatic computer slot identification and address decoder arrangement as defined in claim 1 wherein said means responsive to control signals for placing members of such first group of conductors in communication with said fourth group of conductors is further characterized as responding to such signals for reading by receiving information from said fourth group of conductors and placing it on such bus on such motherboard to be read by such CPU.

5. The automatic computer slot identification and address decoder arrangement as defined in claim 1 wherein said means responsive to control signals for placing members of such first group of conductors in communication with said fourth group of conductors is further characterized as responding to such signals for writing by receiving information from such CPU by way of such motherboard and placing it on said fourth group of conductors on such electrical cable.

6. The automatic computer slot identification and address decoder arrangement as defined in claim 1 wherein said first multiple contact connector means is a receptacle connector, and said second multiple contact connector means is a plug connector.

7. The automatic computer slot identification and address decoder arrangement as defined in claim 1 wherein said means disposed on each of such printed circuit cards for determining an address for reading and an address for writing, based on said electrical configuration, said means disposed on each of such printed circuit cards for decoding address information from such motherboard, and said means responsive to control signals received from such computer bus for placing a plurality of members of such first group of conductors on such computer bus in communication with a corresponding plurality of said fourth group of conductors on such external electrical cable is further characterized as including a programmable logic means.

8. The automatic slot identification and address decoder arrangement as defined in claim 6, wherein said receptacle connector includes a plurality of socket contacts.

9. The automatic slot identification and address decoder arrangement as defined in claim 8, wherein selected ones of said plurality of socket contacts are biased "high" when said selected ones of said plurality of electrical contacts are not short-circuited.

10. The automatic slot identification and address decoder arrangement as defined in claim 8, wherein selected ones of said plurality of socket contacts are biased "low" when said selected ones of said shunt conductors are in use.

11. The automatic slot identification and address decoder arrangement as defined in claim 9, wherein said selected ones of said plurality of socket contacts are biased "high" by a voltage source.

12. The automatic slot identification and address decoder arrangement as defined in claim 11, wherein said voltage source is coupled to a series-connected resistance-capacitance circuit.

13. The automatic slot identification and address decoder arrangement as defined in claim 12, wherein said capacitance is selectively shorted by a jumper wire to result in a binary "0".

14. The automatic computer slot identification and address decoder arrangement as defined in claim 7 wherein said programmable logic means is an erasable array logic device.

15. The automatic computer slot identification and address decoder arrangement as defined in claim 7 wherein said first multiple contact connector means is a receptacle connector and said second multiple contact connector means is a plug connector.

16. The automatic computer slot identification and address decoder arrangement as defined in claim 7 wherein said first multiple contact connector means is a receptacle connector and said second multiple contact connector means is a plug connector, and wherein said means for connecting shunt conductors includes pin contacts of said plug connector which are electrically jumped to signify a binary "0".

17. The automatic computer slot identification and address decoder arrangement as defined in claim 7 wherein said first multiple contact connector means is a receptacle connector and said second multiple contact connector means is a plug connector, and wherein said means for connecting shunt conductors includes pin contacts of said plug connector which are left electrically unjumped to signify a binary "1".

18. The automatic slot identification and address decoder arrangement as defined in claim 7, wherein said programmable logic means is an erasable programmable read only memory device.

19. A dynamic address recognition and decoding arrangement for a computer having a central processor unit, and a backplane communicating with such central processor unit, such backplane having a bus of such computer thereon, such bus having a first group of electrical conductors for conveying each of address information, control signals and data, such control signals including signals for reading and signals for writing, such bus having a plurality of in-line connectors, each of such in-line connectors being adapted to receive a printed circuit card, and make multiple electrical connections to a second group of electrical conductors on such printed circuit card, such printed circuit card being connected to an external electrical cable which is connected to external equipment, said automatic computer slot recognition and address decoder arrangement comprising:

(a) a third group of electrical conductors disposed on such printed circuit card;

(b) a first multiple contact connector means disposed on such printed circuit card for connecting to such external cable, a plurality of contacts of said first multiple contact connector means being connected to corresponding members of said third group of electrical conductors;

(c) a second multiple contact connector means disposed on such external cable having a fourth group of electrical conductors, a plurality of contacts of said second multiple contact connector means being connected to corresponding members of said fourth group of electrical conductors disposed on such electrical cable, said first multiple contact connector means mating with said second multiple contact connector means to provide individual electrical connections between corresponding members of said third group of electrical conductors and said fourth group of electrical conductors;

(d) means for connecting shunt conductors between a plurality of members of said fourth group of electrical conductors for establishing an electrical configuration indicative of address information for such computer card to which such cable is attached;

(e) means disposed on each of such printed circuit cards for applying electrical voltages to a plurality of members of said third group of electrical conductors whereby voltages are applied through selected contacts of said first multiple contact connector means and selected contacts of said second multiple contact connector means to a plurality of members of said fourth group of electrical conductors to sense said electrical configuration indicative of address information; and (f) a programmable logic device disposed on each of such printed circuit cards for determining an address for reading and an address for writing, based on said electrical configuration, for decoding address information from such backplane, and for placing a plurality of members of such first group of conductors on such computer bus in communication with a corresponding plurality of said fourth group of conductors on such electrical cable to external equipment.

20. The dynamic address recognition and decoding arrangement as defined in claim 19, wherein said selected contacts of said second multiple contact connector means are modified by being connected to ground by a jumper wire.

* * * * *

UNITED STATES PATENT AND TRADEMARK OFFICE
CERTIFICATE OF CORRECTION

PATENT NO. : 5,491,830
DATED : February 13, 1996
INVENTOR(S) : Vincent Ferri

It is certified that error appears in the above-indentified patent and that said Letters Patent is hereby corrected as shown below:

In the title, delete "slot" and insert --PERIPHERAL DEVICE--.

Signed and Sealed this

Twenty-first Day of May, 1996

Attest:

BRUCE LEHMAN

Attesting Officer     Commissioner of Patents and Trademarks